United States Patent
Landrieve

(10) Patent No.: US 11,692,971 B2
(45) Date of Patent: Jul. 4, 2023

(54) EDDY CURRENT PROBE, NOTABLY FOR A ROLLING BEARING

(71) Applicant: Aktiebolaget SKF, Gothenburg (SE)

(72) Inventor: Franck Landrieve, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/238,414

(22) Filed: Apr. 23, 2021

(65) Prior Publication Data
US 2021/0364469 A1 Nov. 25, 2021

(30) Foreign Application Priority Data

May 20, 2020 (DE) .......................... 102020206360.5

(51) Int. Cl.
*G01N 27/90* (2021.01)
*G01N 27/904* (2021.01)

(52) U.S. Cl.
CPC ....... *G01N 27/9006* (2013.01); *G01N 27/904* (2013.01)

(58) Field of Classification Search
USPC ............... 324/220, 222, 200, 219, 214, 216, 324/207.22, 207.11, 240
See application file for complete search history.

(56) References Cited

U.S. PATENT DOCUMENTS

| 7,481,583 B2 * | 1/2009 | Aoki | G01P 13/04 384/448 |
| 11,204,067 B2 | 12/2021 | Landrieve | |
| 2009/0115410 A1 * | 5/2009 | McKnight | G01N 27/904 324/240 |
| 2010/0097057 A1 * | 4/2010 | Karpen | G01N 27/904 73/632 |

* cited by examiner

*Primary Examiner* — Nasima Monsur
(74) *Attorney, Agent, or Firm* — Garcia-Zamor Intellectual Property Law, LLC; Ruy Garcia-Zamor

(57) ABSTRACT

An eddy current probe providing a first sensor element having a first body and a first induction coil mounted onto a distal portion of the first body, a second sensor element having a second body and a second induction coil mounted onto a distal portion of the second body, a probe casing provided with first and second through-holes inside which are respectively mounted proximal portions of the first and second bodies of the first and sensor elements, the distal portions of the first and second bodies protruding outwards with regard to the probe casing, and a cap mounted onto the probe casing and covering the distal portions of the first and second bodies and the first and second induction coils.

9 Claims, 4 Drawing Sheets

EDDY CURRENT PROBE, NOTABLY FOR A ROLLING BEARING

CROSS-REFERENCE TO RELATED APPLICATIONS

This application claims priority to German patent application no. 102020206360.5, filed May 20, 2020, the contents of which is fully incorporated herein by reference.

TECHNICAL FIELD

The present invention relates to the field of eddy current probes, notably those used for measuring the displacements of two surfaces of one part.

BACKGROUND OF THE INVENTION

An advantageous application of the invention is to measure the wear of a rolling bearing, notably a large-diameter rolling bearing, in order to predict bearing's residual life.

A large-diameter rolling bearing comprises two concentric inner and outer rings, and at least two rows of rolling elements, such as rollers, arranged between the rings. Such rolling bearings are generally loaded both axially and radially, often with relatively large loads. In this case, reference is made to an orientation roller bearing or slewing roller bearing.

As a result of heavy loads, parts of the rolling bearing, more particularly raceways of the rolling elements, wear out. The wear of the rings and rolling elements leads to a significant increase of the initial bearing clearance. The wear exceeding a certain value can lead to a dramatic bearing failure.

Measuring the wear of the bearing through the clearance increase causing relative axial and radial displacement of the rings helps to predict bearing's residual life.

Such unwanted movements affect to proper functioning of the bearing and the application, with the risk that the bearing rings come in contact and collide. Other elements attached to the bearing rings may also collide.

It is common to replace the bearings when they are worn out. Such maintenance interventions are expensive, especially because of the downtime need for the machines or facilities. It is therefore desirable that such maintenance interventions are timely performed before any contact between the bearing rings, but not too early too.

In order to monitor the bearing condition during its service life, the rolling bearing may comprise two eddy current sensors or probes mounted on the outer ring and facing two distinct surfaces of the inner ring. Each eddy current probe comprises a body, an induction coil mounted on the body, a casing onto which is secured the body and an output cable. The outer ring may further comprise an additional housing inside which are mounted the two eddy current probes.

However, in order to have this combined detection in a limited space, it is necessary to secure inside the housing the two eddy current probes closer to each other than their casing would normally allow. This leads to manual grinding operations of the casings in order to avoid interference of the eddy current probes inside the housing.

One aim of the present invention is to overcome this drawback.

SUMMARY OF THE INVENTION

The invention relates to an eddy current probe provided with a first sensor element comprising a first body and a first induction coil mounted onto a distal portion of the first body, and with a second sensor element comprising a second body and a second induction coil mounted onto a distal portion of the second body.

According to a general feature, the probe further comprises a probe casing to which are secured the first and second sensor elements and provided with first and second through-holes inside which are respectively mounted proximal portions of the first and second bodies of the first and sensor elements, the distal portions of the first and second bodies protruding outwards with regard to the probe casing.

According to another general feature, the probe further comprises a cap mounted onto the probe casing and covering the distal portions of the first and second bodies and the first and second induction coils of the first and second sensor elements.

Thanks to the invention, the first and second inductions coils are secured to a single main probe casing which allows a compact design and avoids special manual grinding operations. The number of assembly operations is thus reduced.

Preferably, the cap is overmoulded on the probe casing, the distal portions of the first and second bodies and the first and second induction coils of the first and second sensor elements being embedded inside the cap. Alternatively, the cap may be secured to the probe casing by any other appropriate means, for example by press-fitting, gluing, etc.

First and second longitudinal axes of the first and second through-holes of the probe casing may be inclined with respect to a longitudinal axis of the probe, the first and second longitudinal axes extending along two opposite directions.

In one embodiment, the cap comprises a frontal face provided with a first wall and with a second wall extending obliquely along two opposite directions. The first wall is located in the continuation of the distal portion of the first body of the first sensor element and is oriented perpendicular to the axis of the first induction coil. The second wall is located in the continuation of the distal portion of the second body of the second sensor element and is oriented perpendicular to the axis of the second induction coil.

The proximal portions of the first and second bodies comprise fixing means to secure the first and second sensor elements to the probe casing. For example, the fixing means may comprise a thread.

In one embodiment, the first sensor element further comprises a first output cable mounted on the proximal portion of the first body and extending outwards with regard to the probe casing, and the second sensor element further comprises a second output cable mounted on the proximal portion of the second body and extending outwards with regard to the probe casing.

For each sensor element, an output cable with armor can be used since the outlet of the associated through-hole of probe casing is aligned with the axis of the induction coil.

Each of the first and second output cables extends inside the associated first or second through-hole of the probe casing.

In one embodiment, at least one of the first and second induction coils of the first and second sensor elements has in cross-section a circular shape such as a circle shape or a semi-circle shape. Alternatively or in combination, at least one of the first and second induction coils of the first and second sensor elements may have in cross-section a polygonal shape, such as a rectangular shape. With a polygonal shape of the induction coil, the associated sensor element can cover the largest possible surface and can get the highest possible detection range for a given probe casing dimension.

The invention also relates to a bearing comprising a first ring and a second ring capable of rotating concentrically relative to one another.

According to a general feature, at least a first tapered groove and at least a second tapered groove are formed on the second ring and are oriented towards the first ring. The first tapered groove has a tapered wall which is inclined with respect to the axis of the bearing. The second tapered groove has a tapered wall which is inclined with respect to the axis of the bearing. The tapered walls of the first and second grooves extend obliquely along two opposite directions.

According to another general feature, the bearing further comprises an eddy current probe as previously defined mounted on the first ring and facing the tapered walls of the first and second tapered grooves of the second ring.

Preferably, the axis of the first induction coil of the probe is perpendicular to the tapered wall of the second tapered groove, and the axis of the second induction coil of the probe is perpendicular to the tapered wall of the first tapered groove.

Accordingly, the measurement accuracy of the prove is improved. However, it remains possible to dispose the probe such that the axis of the first induction coil of the probe is not perpendicular to the tapered wall of the second tapered groove, and/or the axis of the second induction coil of the probe is not perpendicular to the tapered wall of the first tapered groove.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
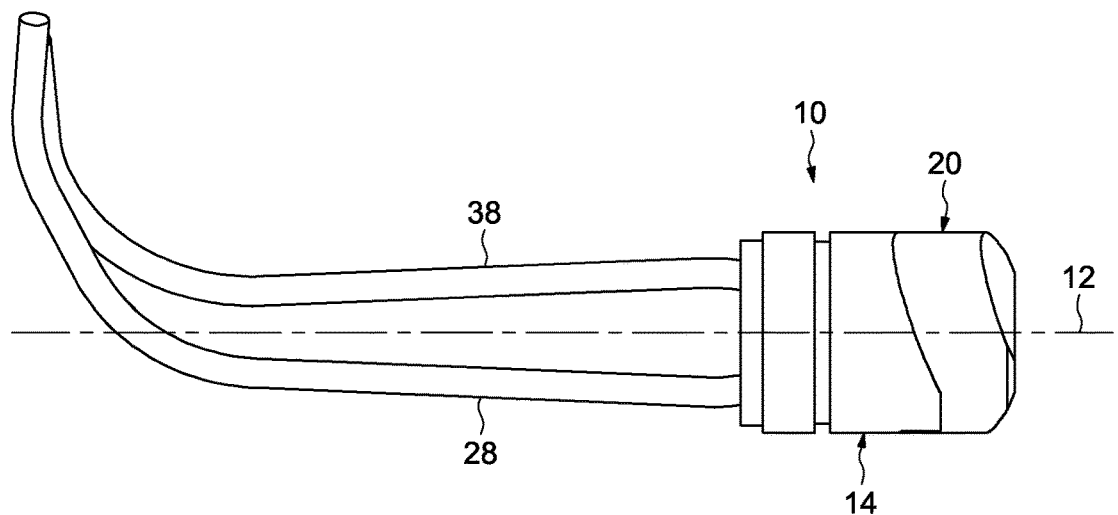
FIG. 1 is a side view of an eddy current probe according to a first example of the invention.

The eddy current probe 10 represented on FIGS. 1 to 5 is adapted to be installed on a rolling bearing.

The probe 10, with a longitudinal axis 12, comprises a single probe casing 14, first and second sensor elements 16, 18 mounted on the probe casing 14, and a single cap 20 covering the first and second sensor elements 16, 18.

The first and second sensor elements 16, 18 are identical to each other. The first sensor element 16 comprises a first body 22 provided with a proximal portion 22a mounted on the probe casing 14, and with a distal portion 22b protruding outwards with respect to the probe casing. The distal portion 22b extends from the proximal portion 22a. In the illustrated example, the first body 22 is made into one part. Alternatively, the first body 22 may be made into at least two parts.

The first sensor element 16 also comprises a first induction coil 24 mounted on the distal portion 22b of the first body. The induction coil 24 extends around an axis 24a inclined with respect to the longitudinal axis 12 of the probe.

In other words, the axis 24a of the induction coil is formed oblique to the longitudinal axis 12. The induction coil 24 is secured to the distal portion 22b of the first body by any appropriate means.

The probe casing 14 extends along the longitudinal axis 12. The probe casing 14 is provided with a first through-hole 26. The through-hole 26 is made in the thickness of the probe casing 14. The probe casing 14 comprises a front face 14a and an opposite rear face 14b. The probe casing 14 is delimited by the front and rear faces 14a, 14b in the axial direction with respect to the longitudinal axis 12. In the illustrated example, the front face 14a has a stepped form.

The through-hole 26 extends from the front face 14a and opens on the rear face 14b. The through-hole 26 extends along an axis 26a coaxial with the axis 24a of the induction coil. The proximal portion 22a of the first body extends inside the through-hole 26. The proximal portion 22a is here secured inside the through-hole 26 by screwing. Alternatively, the proximal portion 22a may be secured to the probe casing 14 by any appropriate means. As previously mentioned, the distal portion 22b of the first body protrudes outwards with respect to the probe casing 14. More precisely, the distal portion 22b of the first body protrudes outwards with respect to the front face 14a of the probe casing. The distal portion 22b axially bears against the front face 14a.

The first sensor element 16 further comprises a first output connecting cable 28 for transmitting sensing data which extends outwards relative to the probe casing 14. The output cable 28 is mounted on the proximal portion 22a of the first body axially on the side opposite to the distal portion 22b. An end of the output cable 28 is inserted into an opening (not referenced) made in the proximal portion 22a of the first body. The output cable 28 is secured into the opening. The output cable 28 may be secured by any appropriate means, for example press-fitting, gluing, etc.

The output cable 28 extends inside the through-hole 26 of the probe casing and protrudes outwards relative to the casing. The output cable 28 connects the induction coil 24 to a control unit (not shown) so as to transmit sensed measurements. Alternatively, the first sensor element 16 may be deprived of such output cable in case of a wireless sensor element.

As previously mentioned, the first and second sensor elements 16, 18 are identical to each other.

The second sensor element 18 comprises a second body 32 provided with a proximal portion 32a mounted on the probe casing 14, and with a distal portion 32b protruding outwards with respect to the probe casing. The distal portion 32b extends from the proximal portion 32a. In the illustrated example, the second body 32 is made into one part. Alternatively, the second body 32 may be made into at least two parts.

The second sensor element 18 also comprises a second induction coil 34 mounted on the distal portion 22b of the second body. The induction coil 34 extends around an axis 34a inclined with respect to the longitudinal axis 12 of the probe. In other words, the axis 34a of the induction coil is formed oblique to the longitudinal axis 12. The induction coil 34 is secured to the distal portion 22b of the first body by any appropriate means.

Figure 2:
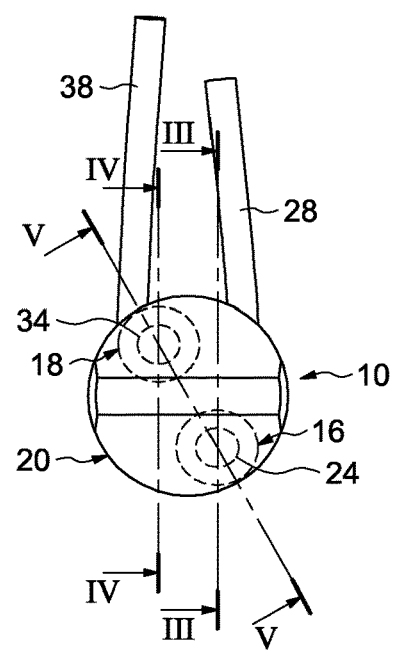
FIG. 2 is a front view of the eddy current probe of FIG. 1.
Figure 3:
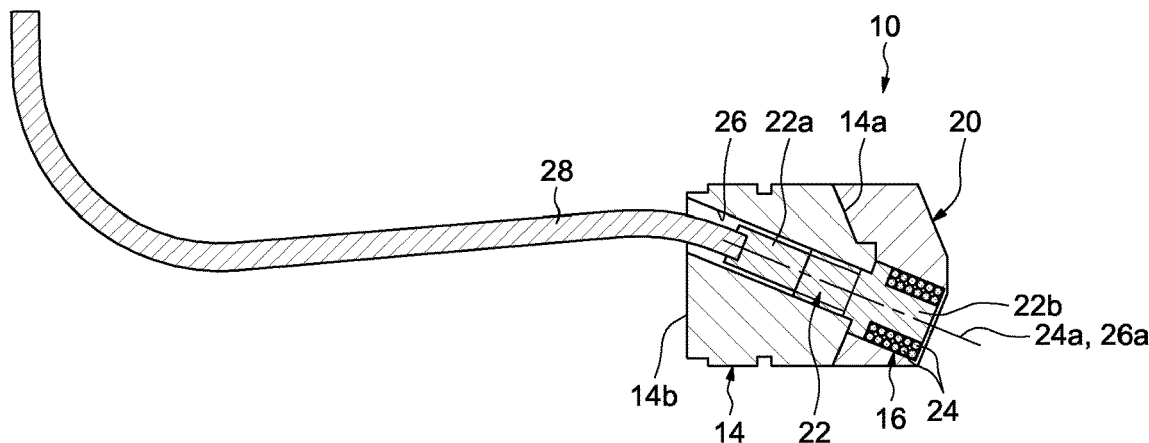
FIG. 3 is a section on of FIG. 2.
Figure 4:
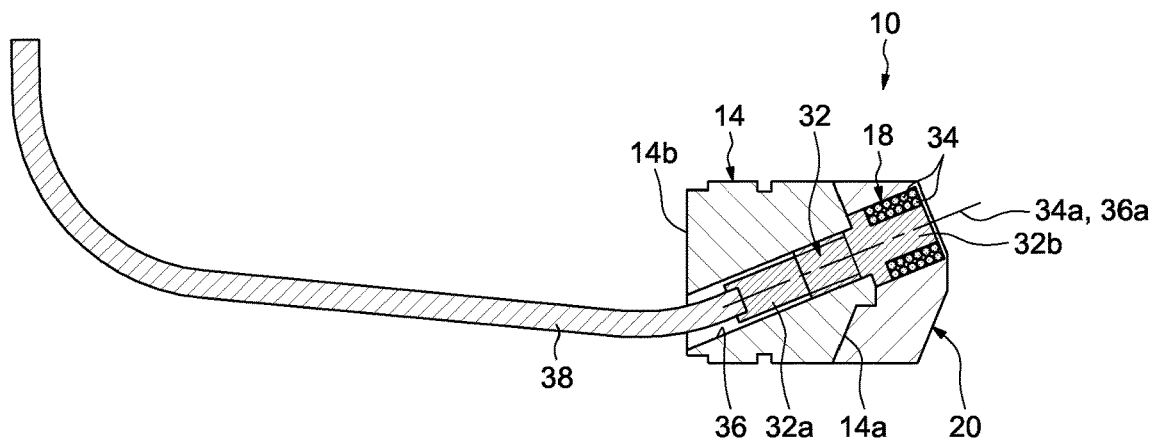
FIG. 4 is a section on IV-IV of FIG. 2.
Figure 6:
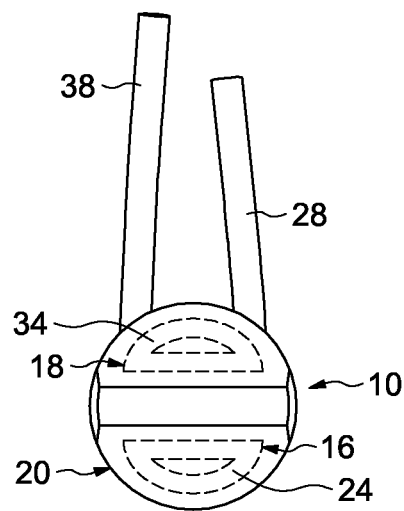
Figure 7:
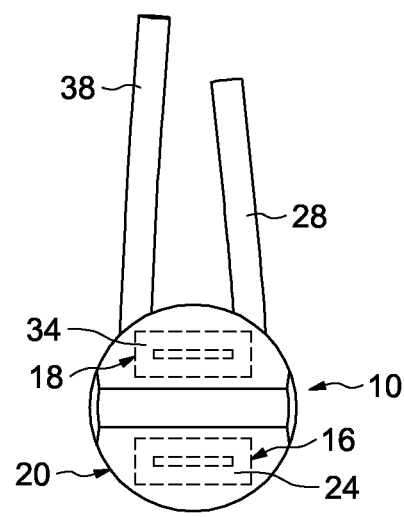

The induction coil 24, 34 of each sensor element 16, 18 may each have in cross-section a circular shape. In the illustrated example, each induction coil 24, 34 has in cross-section a circle shape as shown in FIG. 2. Alternatively, each induction coil 24, 34 may have other circular shape, for example a semi-circle shape as shown in FIG. 6. In another variant, each induction coil 24, 34 may have in cross-section other shapes, for example a rectangular shape as shown in FIG. 7.

Figure 5:
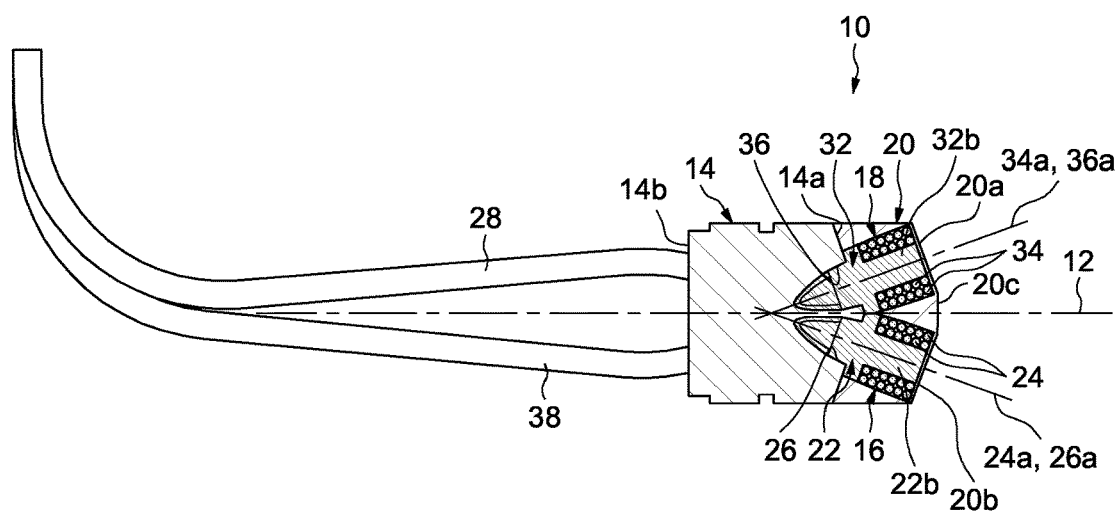
FIG. 5 is a section on V-V of FIG. 2, and FIGS. 6 and 7 are front views of eddy current probes according to second and third examples of the invention.

In a median plane of the probe 10 as shown on FIG. 5, a first angle is formed between the longitudinal axis 12 and the coaxial axes 24a, 26a, and a second angle is formed between the longitudinal axis 12 and the coaxial axes 34a, 36a. The first and second angles are opposite. In the illustrated example, the values of the first and second angles are equal. Alternatively, these values may be different to each other.

The probe casing 14 is provided with a second through-hole 36. The through-hole 36 is made in the thickness of the probe casing 14. The through-hole 36 extends from the front face 14a and opens on the rear face 14b. The through-hole 36 extends along an axis 36a coaxial with the axis 34a of the induction coil. The proximal portion 32a of the second body extends inside the through-hole 36. The proximal portion 32a is here secured inside the through-hole 36 by screwing. Alternatively, the proximal portion 32a may be secured to the probe casing 14 by any appropriate means. As previously mentioned, the distal portion 32b of the second body protrudes outwards with respect to the probe casing 14. More precisely, the distal portion 32b of the second body protrudes outwards with respect to the front face 14a of the probe casing. The distal portion 32b axially bears against the front face 14a.

The second sensor element 18 further comprises a second output connecting cable 38 for transmitting sensing data which extends outwards relative to the probe casing 14. The output cable 38 is mounted on the proximal portion 32a of the second body axially on the side opposite to the distal portion 32b. An end of the output cable 38 is inserted into an opening (not referenced) made in the proximal portion 32a of the second body. The output cable 38 is secured into the opening. The output cable 38 may be secured by any appropriate means, for example press-fitting, gluing, over-moulding the first body 22, etc.

The output cable 38 extends inside the through-hole 36 of the probe casing and protrudes outwards relative to the casing. The output cable 28 connects the induction coil 24 to the control unit. Alternatively, the second sensor element 18 may be deprived of such output cable in case of a wireless sensor element.

The cap 20 is mounted onto the probe casing 14 and covers the distal portions 22b, 32b of the first and second bodies of the sensor elements 16, 18. The cap 20 also covers the induction coils 24, 34 of the sensor elements. The cap 20 also covers the front face 14a of the probe casing.

The cap 20 is overmoulded on the distal portions 22b, 32b of the first and second bodies, on the induction coils 24, 34 and on the front face 14a of the probe casing. The distal portions 22b, 32b and the induction coils 24, 34 of the sensor elements 16, 18 are embedded inside the cap 20. The distal portions 22b, 32b and the induction coils 24, 34 are not accessible from the outside. In other words, the projecting parts of the sensor elements 16, 18 relative to the front face face 14a of the probe casing are encapsulated inside the cap 20. For example, the cap 20 may be made of epoxy resin.

The cap 20 comprises a frontal face provided with a first wall 20a and with a second wall 20b extending obliquely along two opposite direction. In the illustrated example, the front face of the cap is further provided with a connecting surface 20c interposed between the first and second walls 20a, 20b. Alternatively, the second wall 20b may extend the first wall 20a.

The first wall 20a of the cap is located in the continuation of the distal portion 32b of the second body of the sensor element 18 and is oriented perpendicular to the axis 34a of the second induction coil. The second wall 20b of the cap is located in the continuation of the distal portion 22b of the first body of the sensor element 16 and is oriented perpendicular to the axis 24a of the first induction coil.

Figure 8:
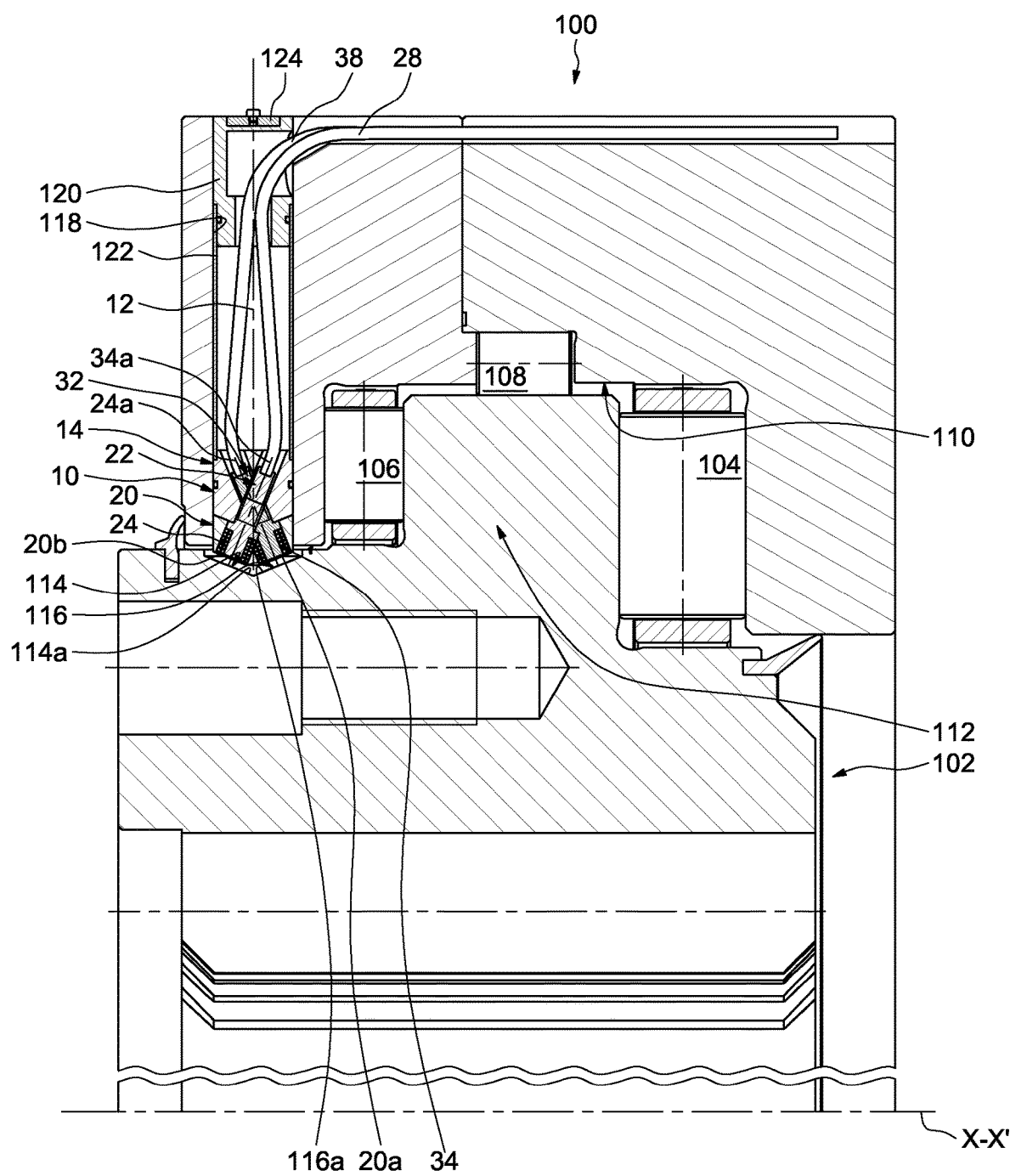
FIG. 8 is a partial cross-section of a rolling bearing equipped with the eddy current probe of FIGS. 1 to 5.

As previously mentioned, the probe 10 is adapted to be installed on a rolling bearing. The rolling bearing as illustrated on FIG. 8 is a large-diameter rolling bearing comprising a first ring 100 and a second ring 102. In the illustrated example, the first ring 100 is the outer ring whereas the second ring 102 is the inner ring.

As will be described later, the probe 10 is mounted on the outer ring 102. The outer and inner rings 100, 102 are concentric and extend axially along the bearing rotation axis X-X' which runs in an axial direction. The rings 100, 102 are of the solid type.

In the illustrated example, the rolling bearing comprises two rows of axial rollers 104, 106 which are arranged between the outer and inner rings 100, 102 in order to form an axial thrust, and a row of radial rollers 108 which are arranged between the rings to form a radial thrust.

The outer ring 100 comprises an annular groove 110 opening in a radial direction inwardly towards the inner ring 102. The outer ring 100 comprises an inner stepped cylindrical surface or bore (not referenced) from which the groove 110 is formed.

The inner ring 12 comprises an annular protruding nose 112 engaging into the annular groove 110 of the outer ring. The nose 112 extends radially outwards. The protruding nose 112 protrudes radially from the outer cylindrical surface (not referenced) of the outer ring.

The rows of rollers 104, 106 are arranged axially between the nose 112 of the inner ring and the groove 110 of the outer ring. The rows of rollers 104, 106 are disposed on each side of the nose 112 of the inner ring. The row of rollers 108 is arranged radially between the nose 112 of the inner ring and the groove 110 of the outer ring.

The probe 10 is provided to detect relative displacements between the outer and inner rings 100, 102. To this end, first and second annular tapered grooves 114, 116 are also formed on the inner ring 102. In the illustrated example, the grooves 114, 116 are formed on the outer cylindrical surface of the inner ring.

The first groove 114 extends radially inwards from the outer cylindrical surface of the inner ring. The groove 114 comprises an annular tapered portion or wall 114a extending obliquely inwards. The tapered wall 114a has a frustoconical shape. The tapered wall 114a is inclined with respect to the axis X-X' of the rolling bearing. In other words, the tapered wall 114a is formed oblique to the axis X-X'. In a radial plane of the rolling bearing as shown on FIG. 8, a first taper angle (not referenced) is formed between the tapered wall 114a of the groove and the outer surface of the inner ring. For example, the value of the first taper angle may be preferably comprised between 15° and 30°.

In the illustrated example, the groove 114 is provided with an annular radial side wall (not referenced) extending radially inwards the outer surface of the inner ring and from which extends the tapered wall 114a. Alternatively, the groove 114 may be deprived of such side wall. In this case, the tapered wall 114a extends directly from the outer surface of the inner ring.

The second groove 116 extends radially inwards from the outer surface of the inner ring. In the illustrated example, the second groove 116 extends axially from the first groove 114.

The groove 116 comprises an annular tapered portion or wall 116a extending obliquely inwards. The tapered wall 116a has a frustoconical shape. The tapered wall 116a is inclined with respect to the axis X-X' of the rolling bearing. The tapered wall 116a is inclined with respect to the outer surface of the inner ring. A second taper angle (not referenced) is formed between the tapered wall 116a and the outer surface of the inner ring. In the illustrated example, the value of this second taper angle is equal to the value of the first taper angle.

In the illustrated example, the second groove 116 is provided with an annular radial side wall (not referenced) extending radially inwards the outer surface of the inner ring and from which extends the tapered wall 116a. Alternatively, the groove 116 may be deprived of such side wall. In this case, the tapered wall 116a extends directly from the outer surface of the inner ring.

As previously mentioned, in the illustrated example, the second groove 116 extends axially from the first groove 114. Here, the tapered wall 116a of the second groove extends the tapered wall 114a of the second groove. Alternatively, a cylindrical bottom could interconnect these tapered walls.

From the outer surface of the inner ring, the tapered wall 114a of the groove 114 extends obliquely inwards along a first direction and the tapered wall 116a of the groove 116a extends obliquely inwards along a second direction which is opposite to the first direction. In the illustrated example, the tapered wall 116a of the groove 116a is symmetric to the tapered wall 114a of the groove 114 with respect to a radial plane passing through the edge between the walls.

The probe 10 faces the first and second grooves 114, 116 of the inner ring.

More precisely, the first wall 20a of the cap 20 of the probe faces the second groove 116. The first wall 20a faces the tapered wall 116a of the groove. The second induction coil 34 enables to measure distances to the tapered wall 116a. The axis 34a of the induction coil is perpendicular to the tapered wall 116a. The distances are measured along the axis 34a of the induction coil.

The second wall 20b of the cap 20 faces the first groove 114. The second wall 20b faces the tapered wall 114a of the groove. The first induction coil 24 enables to measure distances to the tapered wall 114a. The axis 24a of the induction coil is perpendicular to the tapered wall 114a. The distances are measured along the axis 24a of the induction coil.

The outer ring 100 is provided with a radial through-hole 118 inside which the probe 10 is located. The through-hole 118 extends from the outer surface of the outer ring and opens on the bore. The through-hole 118 radially faces the first and second grooves 114, 116 of the inner ring.

In the illustrated example, the probe 10 is mounted into the through-hole 118 and protrudes radially into the radial space provided between the outer and inner rings 100, 102. The probe 10 also protrudes into the first and second grooves 114, 116. The probe 10 remains spaced apart from the tapered wall 114a, 116a of the grooves. Alternatively, the probe 10 may be entirely located inside the through-hole 118.

In the illustrated example, the probe 10 is further provided with a plug 120 which closes and seals the through-hole 118, and with an annular spacer 122 axially interposed between the probe casing 14 and the plug 120. The plug 120 and the spacer 22 are located radially into the through-hole 118. The spacer 122 is secured to the probe casing 14, by any appropriate means for example by force-fitting. The plug 120 is secured to the spacer 122, by any appropriate means for example by force-fitting.

The unit formed by the probe 10, the plug 120 and the spacer 122 is secured to the outer ring 100 by a plate 124 connected to the plug 120 and screwed onto the outer surface of the outer ring. The output cables 28, 38 of the probe extend inside the spacer 122 and the plug 120. The plug 120 is provided with a through-opening (not referenced) wherein the output cables 28, 38 go through.

Otherwise, as previously mentioned, in this example, the first ring of the rolling bearing is the outer ring 10 whereas the second ring is the inner ring 12.

As an alternative, it could be possible to provide a reversed arrangement with the first ring forming the inner ring and the second ring forming the outer ring. In this case, each of the tapered groove 114, 116 is formed on the axial inner cylindrical surface of the outer ring, which forms the bore of the outer ring, and the probe 10 is mounted on the inner ring.

In this example, the rolling bearing is provided with three rows of rolling elements. Alternatively, the rolling bearing may comprise only one row of rolling elements, or two rows of rolling elements, or four or more rows of rolling elements. In the illustrated example, the rolling elements are rollers. The rolling bearing may comprise other types of rolling elements, for example balls. In another variant, the bearing may also be a sliding bearing having no rolling elements.

In the illustrated example, the probe 10 is mounted on a bearing. Alternatively, the probe may be mounted on other types of machine elements.

The invention claimed is:

1. A bearing arrangement configured with an eddy current probe, comprising:
   an outer ring,
   an inner ring configured to rotate relative to the outer ring and having an outer axially extending surface,
   a plurality of rolling elements disposed between the inner ring and the outer ring,
   a groove formed in the outer axially extending surface of the inner ring, the groove having a first face extending obliquely inwards and a second face extending obliquely outwards,
   wherein the eddy current probe comprising:
   a first sensor element having a first body and a first induction coil mounted onto a distal portion of the first body, the first induction coil being wrapped around a first longitudinal axis,
   a second sensor element having a second body and a second induction coil mounted onto a distal portion of the second body, the second induction coil being wrapped around a second longitudinal axis,
   a probe casing securing the first and second sensor elements to the outer ring and provided with first and second through-holes inside which are respectively mounted proximal portions of the first and second bodies of the first and second sensor elements, the distal portions of the first and second bodies protruding outwards with regard to the probe casing, and
   a cap mounted onto the probe casing and covering the distal portions of the first and second bodies and the first and second induction coils of the first and second sensor elements,
   wherein the first sensor element is configured to measure a distance from the first longitudinal axis to the first face of the groove and the second sensor element is configured to measure a distance from the second longitudinal axis to the second face of the groove, the first and second faces being flat when viewed in cross-section, the first longitudinal axis being askew from perpendicular from the first face, the second longitudinal axis being askew from perpendicular with the second face, and wherein the first longitudinal axis is not parallel to the first face and the second longitudinal axis is not parallel to the second face.

2. The bearing arrangement according to claim 1, wherein the first and second longitudinal axes of the first and second through-holes of the probe casing are inclined with respect to a longitudinal axis of the probe, the first and second longitudinal axes extending along two opposite directions.

3. The bearing arrangement according to claim 1, wherein the cap comprises a frontal face provided with a first wall and with a second wall extending obliquely along two opposite directions, the first wall being located in the continuation of the distal portion of the first body of the first sensor element and being oriented perpendicular to the axis of the first induction coil, the second wall being located in the continuation of the distal portion of the second body of the second sensor element and being oriented perpendicular to the axis of the second induction coil.

4. The bearing arrangement according to claim 1, wherein the proximal portions of the first and second bodies comprise fixing means to secure the first and second sensor elements to the probe casing.

5. The bearing arrangement according to claim 1, wherein the first sensor element further comprises a first output cable mounted on the proximal portion of the first body and extending outwards with respect to the probe casing, and the second sensor element further comprises a second output cable mounted on the proximal portion of the second body and extending outwards with respect to the probe casing.

6. The bearing arrangement according to claim 1, wherein at least one of the first and second induction coils of the first and second sensor elements has in cross-section a circular shape.

7. The bearing arrangement according to claim 1, wherein at least one of the first and second induction coils of the first and second senor elements has in cross-section a polygonal shape.

8. A bearing comprising:
a first ring, and
a second ring capable of rotating concentrically relative to one another, wherein at least a first tapered groove and at least a second tapered groove are formed on the second ring and are oriented towards the first ring, the first tapered groove having a tapered wall which is inclined with respect to an axis of the bearing, the second tapered groove having a tapered wall that is inclined with respect to the axis of the bearing, the tapered walls of the first and second grooves extending obliquely along two opposite directions, an eddy current probe, comprising:
a first sensor element having a first body and a first induction coil mounted onto a distal portion of the first body, the first induction coil being wrapped around a first longitudinal axis,
a second sensor element having a second body and a second induction coil mounted onto a distal portion of the second body, the second induction coil being wrapped around a second longitudinal axis,
a probe casing securing the first and second sensor elements and provided with first and second through-holes inside which are respectively mounted proximal portions of the first and second bodies of the first and second sensor elements, the distal portions of the first and second bodies protruding outwards with regard to the probe casing, and
a cap mounted onto the probe casing and covering the distal portions of the first and second bodies and the first and second induction coils of the first and second sensor elements, and
wherein the eddy current probe is mounted on the first ring and facing the tapered walls of the first and second tapered grooves of the second ring,
wherein the first sensor element is configured to measure a distance from the first longitudinal axis to the tapered wall of the first tapered groove and the second sensor element is configured to measure a distance from the second longitudinal axis to the tapered wall of the second tapered groove, the first longitudinal axis being askew from perpendicular from the tapered wall of the first tapered groove, the second longitudinal axis being askew from perpendicular with the tapered wall of the second tapered groove, and
wherein the first longitudinal axis is not parallel to the tapered wall of the first tapered groove and the second longitudinal axis is not parallel to the tapered wall of the second tapered groove.

9. The bearing according to claim 8, wherein the first longitudinal axis of the first induction coil of the eddy current probe is perpendicular to the tapered wall of the second tapered groove, the second longitudinal axis of the second induction coil of the probe being perpendicular to the tapered wall of the first tapered groove.

* * * * *